Dec. 5, 1961    J. T. BARRON    3,011,685
SYSTEM WITH LEAKPROOF PLURAL-WAY BALL VALVE
Filed Nov. 27, 1957    3 Sheets-Sheet 1

United States Patent Office 3,011,685
Patented Dec. 5, 1961

3,011,685
SYSTEM WITH LEAKPROOF PLURAL-WAY
BALL VALVE
John T. Barron, Willow Grove, Pa., assignor to Milton
Roy Company, St. Petersburg, Fla., a corporation of
Pennsylvania
Filed Nov. 27, 1957, Ser. No. 699,296
6 Claims. (Cl. 222—249)

This invention relates to a system for feeding fluid and has for an object the provision of a leakproof plural-way valve of the ball check type for controlling the feed of either gas or liquid in measured quantities. The plural-way ball valve includes novel construction which particularly suits it for handling corrosive or otherwise dangerous fluids without the need of packing.

In accordance with the present invention, there is provided a plural-way valve device including a pair of body members each of which has a plurality of valve passages. A plunger is disposed in each of the valve passages and a flexible diaphragm is positioned between the body members for sealing the valve passages in one of the body members from the other. One of the body members is provided with an inlet passage and an outlet passage which communicate with the valve passages in that body member. Ball valves are disposed in the valve passages of that one body member and they are operable by the plunger in the valve passages in both body members. The ball valves are disposed between the inlet and outlet passages for controlling the fluid flow therebetween and rotatable cam means is provided which is operable between predetermined positions for opening and closing the ball valves in predetermined sequence to control fluid flow through the plural-way valve device.

Further, in accordance with the invention there is provided a second pair of body members having flow passages therein and a flexible diaphragm disposed between the members of said second pair of sealing the flow passages in the second pair of body members from each other. There is further provided flow passages connecting the ball valves in the first pair of body members with the flow passages in the second pair of body members whereby the fluid may be alternately directed against the opposite sides of the flexible diaphragm in the second pair of body members to provide a metering device for the fluid.

By separating the ball valves from the valve actuating mechanism by means of a flexible diaphragm there is provided a leakproof valve device of relatively simple construction and where only the moving parts above the flexible diaphragm need be of corrosion-resistant material in order for the device to handle corrosive or otherwise dangerous fluids.

For more detailed disclosure of the invention and for further objects and advantages thereof, reference is to be had to the following description taken in conjunction with the accompanying drawings in which.

Figure 1:
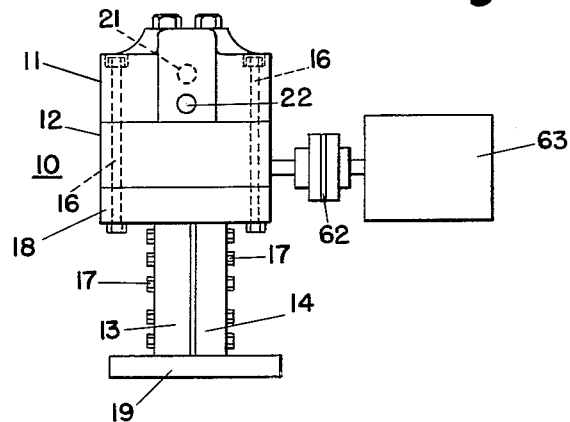
FIG. 1 is an elevational view of an embodiment of the invention.

Referring to FIG. 1, there is shown a plural-way valve pumping device 10, the valve portion of which includes a pair of body members 11 and 12 and the pumping portion of which includes a pair of body members 13 and 14. The body members 11 and 12 are adapted to be held together, for example, by through bolts 16 and the pair of body members 13 and 14 in the pumping section are likewise adapted to be held together as by through bolts 17. Each pair of body members 11–12 and 13–14 is adapted to be separated by flexible diaphragm means as hereinafter to be described. The body members 11 and 12 of the valve portion are adapted to be connected to the pumping portion including members 13 and 14 by way of a connecting plate 18, with the complete device being adapted to be supported on a base plate 19.

Figure 2:
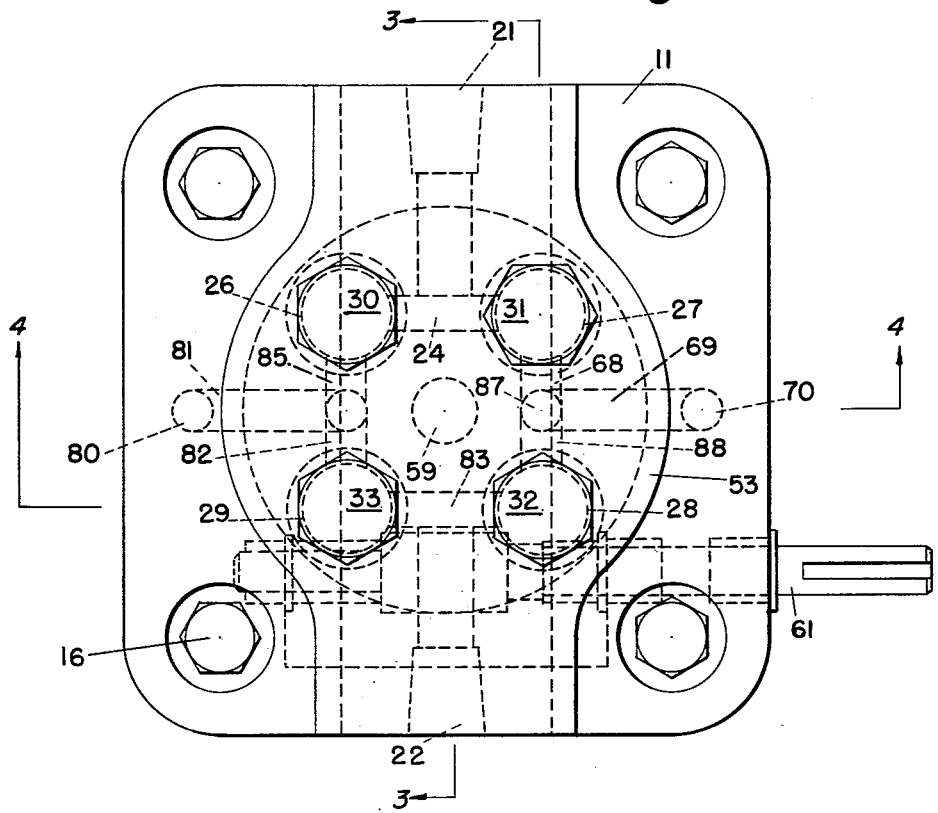
FIG. 2 is a top plan view of the embodiment shown in FIG. 1.

Referring to FIG. 2, it will be seen that the device 10 includes four valves 30–33 of the ball check type. The upper body member 11 is provided with a pressure inlet passage 21 and a low-pressure discharge passage 22. It will be noted in FIGS. 1 and 3 that the inlet passage 21 is disposed at a higher elevation than the outlet passage 22. Again referring to FIG. 2, it will be seen that the inlet passage 21 enters the body member 11 and connects with an internal flow passage 24 which interconnects valve passages 26 and 27, the latter respectively containing the ball valve assemblies 30 and 31. Valve passages 28 and 29 respectively contain ball valve assemblies 32 and 33 as hereinafter to be described. As may be seen in FIG. 3 the ball valve assembly 31 comprises a valve seat 35 which is disposed in valve passage 27 and is adapted to cooperate with a ball check 36 which is held in position relative to the flow passage through the seat 35 as by ball guides 37. A valve cap 38 is disposed at the upper end of valve passage 27 to maintain the ball check 36 within the guide 37. A seal in the form of an O-ring 40 is provided between the member 38 and the body member 11 to prevent the fluid passing through the body member 11 from escaping. The cap member 38 is adapted to be held tightly against the O-ring 40 by a threaded plug 41 which is threaded into body member 11.

Figure 3:
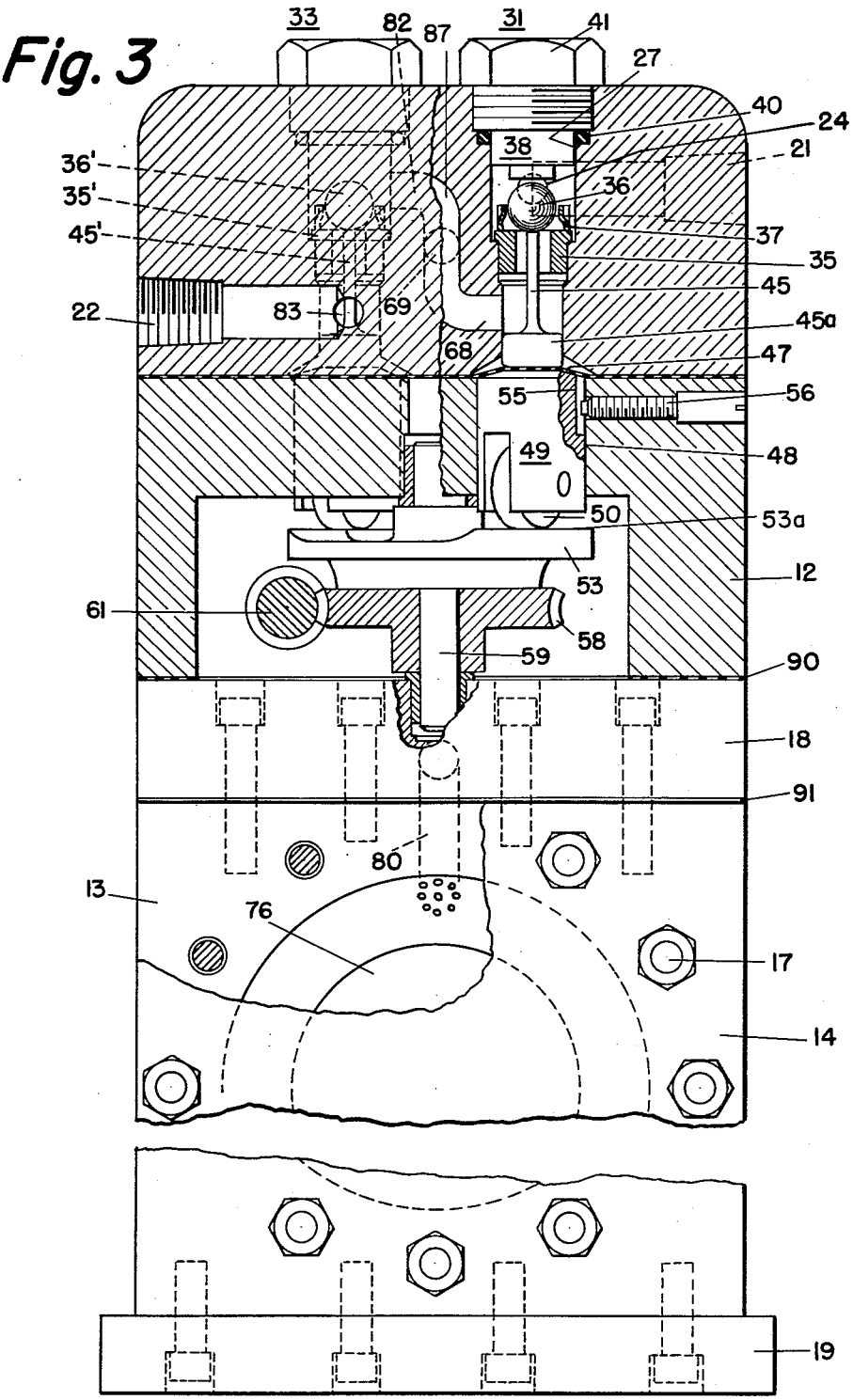
FIG. 3 is a vertical sectional view taken along the lines 3—3 in FIG. 2.
Figure 5:
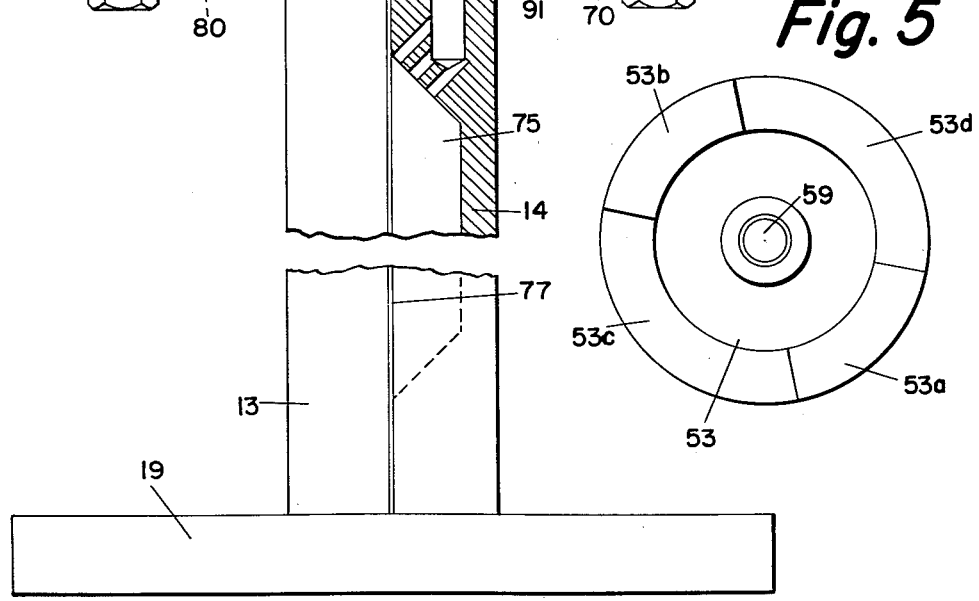
FIG. 5 is a plan view of a rotatable cam employed in the embodiment shown in FIG. 1.

As the liquid enters inlet passage 21 it may pass through either of valve assemblies 30 or 31 depending upon which one is open. As shown in FIG. 3, the valve assembly 31 is in open position and thus the fluid will flow through valve assembly 31 since valve assembly 30 is adapted to be in closed position whenever valve assembly 31 is in open position and vice versa. The ball valve 36 is held in open position off of its seat 35 by means of a pusher or plunger member 45. The pusher 45 is provided with an enlarged lower portion 45a which is guided for reciprocal movement by the side walls of the valve passage 27. The upper portion of the pusher 45 is of relatively small cross-section and extends through the passage in valve seat 35 where it engages the ball 36. The ball 36 is separate from plunger 45 and is not connected to it. The pusher 45 at its lower end engages a flexible resilient diaphragm 47 made from a suitable material such as rubber or fluorocarbon plastic which forms a liquid-tight seal between the upper body member 11 and the lower body member 12. Beneath the diaphragm 47 and in line with passage 27 is another passage 48 in body member 12 which is adapted to receiver a plunger 49. The plunger 49 at its upper end is adapted to engage the diaphragm 47 directly opposite the lower end 45a of pusher 45. The lower end of the plunger 49 is provided with a roller 50 which is adapted to ride on the cam surface of a rotatable cam 53. The cam 53 is shown in plan view on FIG. 5 and includes two oppositely spaced raised portions or steps 53a and 53b. The raised portions 53a and 53b are separated by two dwell or lowered portions 53c and 53d. As may be seen in FIG. 3, the raised portion 53a is in engagement with the roller 50 of the plunger associated with valve assembly 31.

The plunger 49 is provided with a groove 55 which receives a key member 56 to prevent the plunger 49 from rotating about its axis. The cam 53 is secured to a gear 58 both of which are secured to a cam shaft 59. The gear 58 is adapted to engage a worm 61, the latter being connected by way of a coupling 62, FIG. 1, to a suitable drive motor 63. The drive motor 63 is adapted to rotate the cam shaft 59 through 90° intervals and thus enables the cam 53 to open and close the valve assemblies 30–33 in pairs at the end of each suction and discharge stroke. As will be seen from FIG. 5, the cam rises 53a and 53b are adapted to open the pair of valves 30 and 32 when the pair of valves 31 and 33 are closed and vice versa. It will be noted that the pair of valves which are open are adapted to be closed by the cam before the other pair of valves are subsequently opened. Thus the valves are all closed at one position in each cycle. Each of the valve assemblies 30–33 are identical in construction and like parts are identified with corresponding reference characters and the parts of valve assembly 33 have been identified with a prime designation for clarity in the explanation.

As the fluid passes through the open ball valve assembly 31, FIG. 3, it passes through the passage in the seat 35 to a lower level at passage 68. The fluid then moves upwardly to an intermediate level where it enters flow passage 69 FIGS. 2–4. Flow passage 69 extends horizontally through the body member 11 and interconnects with a vertical flow passage 70 which is adapted to extend downwardly through the body member 12 and through the connecting plate 18 into communication with the pumping chamber or passage 75 in the body member 14 of the pump section of the device 10. The chamber 75 is separated from a similar chamber 76 in pump section 13 on the opposite side of a flexible diaphragm 77. When the fluid enters the pumping chamber 75 is moves the flexible diaphragm 77 towards the opposite wall in diaphragm chamber 76 and thus forces the fluid from the chamber 76 previously received therein. The fluid leaving chamber 76 is forced upwardly through a flow passage 80 in connector plate 18 through the extension of this flow passage in body member 12 and into body member 11 which is where it enters a horizontal flow passage 81 FIGS. 2 and 4. The fluid then passes upwardly to another horizontal passage 82 and thence through the open ball valve assembly 33. At this time the ball valve assembly 30 is in closed position the same as ball valve assembly 32. The fluid leaves flow passage 82 and moves past the ball 36' through the valve seat 35' and along the pusher 45' until it reaches the horizontal passage 83. The passage 83 interconnects with the low pressure discharge or outlet passage 22 which is at the lower level as shown in FIG. 3.

After the foregoing operation has been completed, the motor 63 is adapted to rotate the cam 53 through an angle of 90° at which time the valve assemblies 30 and 33 are moved to closed position and valve assemblies 31 and 32 are moved to open position thus reversing the positions of valve assemblies 30–33 from their previously described positions. Since valve assembly 30 is now in open position, the fluid entering inlet 21 will pass from flow passage 24 through valve assembly 30 thence through a flow passage 85 which is at a low level similar to flow passage 68 in FIG. 3 thence upwardly to flow passage 81 which is at an intermediate level, FIG. 4. The fluid flows from flow passage 81 downwardly through flow passage 80 and into the pumping chamber 76 forcing the flexible diaphragm 77 towards the wall of pump chamber 75 and expelling the fluid therein. The liquid from chamber 75 moves upwardly through the flow passage 70 into flow passage 69, thence upwardly in flow passage 87 into horizontal flow passage 88, FIG. 2 which is at the upper level similar to flow passage 82. The liquid then passes through valve assembly 32 which is now in open position similar to valve assembly 30. After the liquid passes through valve assembly 32, it enters the flow passage 83 which connects with the discharge or outlet passage 22.

From the above description it will be seen that the pumping device 10 is particularly suited for handling corrosive and toxic fluids as all of the parts above the diaphragm 47 which separates body members 11 and 12 may be formed from corrosive-resistant material. For example, the housing or body member 11 may be formed from any suitable metal which may be cast, forged or machined such as stainless steel, or it may be a non-metallic material such as one of the fluorocarbon resins or poly vinyl chloride, or other suitable plastic. The ball members 36 may be formed from glass, ceramic or corrosion-resistant metal and the pushers or plungers 45 may be formed from similar material. The flexible diaphragm 47 forms a seal between the moving parts in the body member 11 with respect to the moving parts in the lower body member 12 and thus the plunger groove 55 and the rotatable cam 53 and associated parts need not be formed from corrosion-resistant material. This enables the device to be constructed at a substantial saving and also insures that the operating mechanism will function without danger of corrosion even though the cam mechanism is not formed from corrosion-resistant material. By casting the body members with internal flow passages in the manner described above, there is eliminated the need for exterior piping which ordinarily requires additional precautions in regard to preventing leakage. The connections between the flow passages in the various sections are made with gaskets where it is indicated at 90 and 91 and as the various parts are held tightly together by through bolt construction, the danger of any leakage through these gaskets is minimized.

Figure 4:
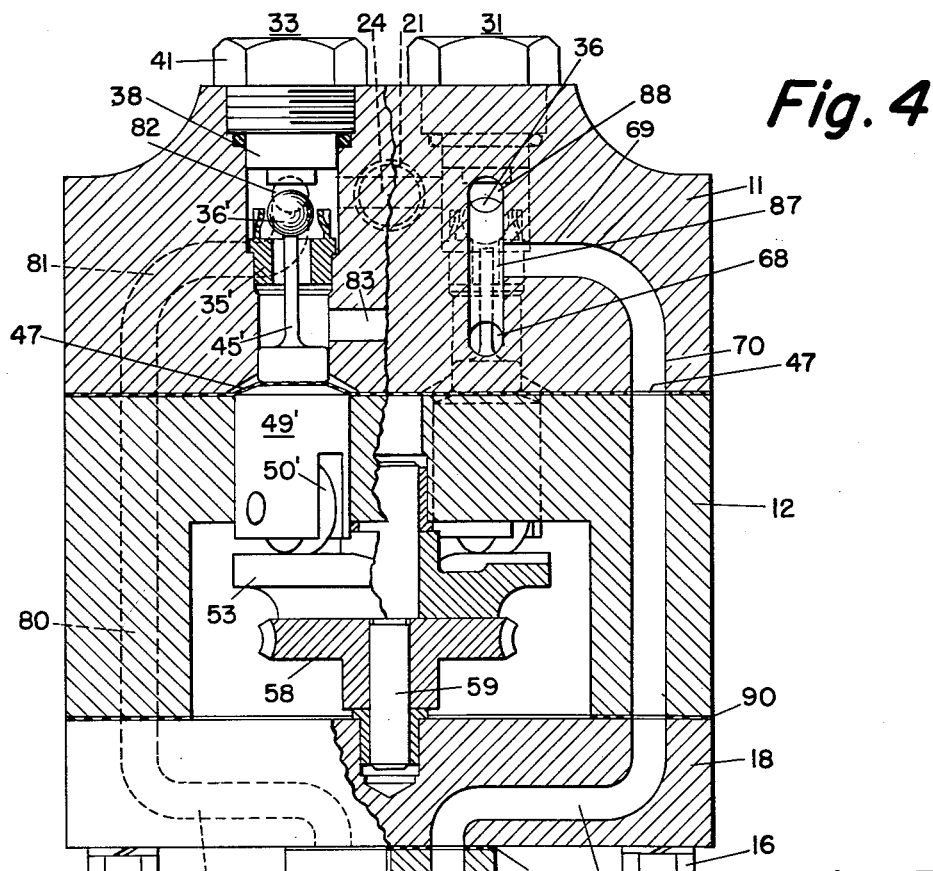
FIG. 4 is a vertical sectional view taken along the lines 4—4 in FIG. 2.

It will be apparent from FIG. 4 that the horizontal flow passages 69 and 81 may be extended through the side walls of the upper body member 11 and that the vertical flow passages 70 and 80 may be eliminated. This construction is particularly suited for applications where the plural-way valve device 10 is not employed with a flexible diaphragm pump.

The key members 56 which are adapted to be threaded through the body member 12 with their ends extending into the slot or groove 55 in plunger 49 control the position of the rollers 50 with respect to the axis of the cam shaft 59 and are adapted to keep the rollers 50 tangent to the circumference of the circle circumscribed about the axis of the cam shaft 59.

As mentioned above, the ball members 36 need not be connected to the ends of the pushers 45. It is not necessary to provide spring returns for the ball valves 36 as the balls will be held tightly against their seats in the respective valve assemblies when they are in closed position due to the pressure created by the liquid as it passes through the device.

While the preferred embodiment of this invention has been illustrated, it is to be understood that other modifications thereof may be made within the scope of the appended claims.

What is claimed is:

1. A leakproof plural-way valve pumping device comprising a pair of body members, a plurality of valve passages in each of said body members, a plunger in each of said valve passages, each said plunger including a portion having a diameter adequate to engage the side wall of its respective said valve passage to guide said plunger for reciprocal movement, an imperforate flexible diaphragm separating said body members and completely isolating said plunger in one of said body members from said plunger in the other one of said body members for sealing said valve passages in one of said body members from the other, an inlet passage in said one body member, an outlet passage in said one body member, said inlet and outlet passages communicating with said valve passages in said one body member, valve means in said valve passages of said one body member operable by said plungers in said valve passages in both body members, said valve means being disposed between said inlet and outlet passages to control the fluid flow therebetween, a second pair of body members, flow passages in each of said second pair of body members, a second flexible diaphragm sealing said flow passages in said second pair of body members from each other, flow passages connecting said valve means in said first pair of body members with said flow passages in said second pair of body members, all of said flow passages being disposed internally of said pairs of body members to provide a leakproof device, and cam means supported within said device between said pairs of body members, said cam means being rotatable between predetermined positions for opening and closing said valve means in predetermined sequence to control fluid flow through said plural-way valve device.

2. A plural-way valve pumping device according to claim 1 wherein said second pair of body members comprises a diaphragm pump having pumping chambers separated by said second flexible diaphragm, and rotatable means for said cam means to operate said valve means alternately to admit fluid to each side of said diaphragm pumping chambers whereby as the fluid enters one of the pumping chambers it concurrently pushes fluid from the other.

3. A plural-way valve pumping device according to claim 1 wherein said valve means comprises ball valves.

4. A plural-way valve pumping device according to claim 1 including a cam shaft for said cam means, the axis of said cam shaft being disposed parallel to the axes of said plungers, and means for restraining said plungers from rotation about their axes.

5. A plural-way valve pumping device according to claim 4 wherein said plungers are disposed in pairs and one plunger of said each of said pairs of plungers includes roller means adapted for engagement wtih the cam surface on said cam means, said roller means being tangent to the circumference of a circle circumscribed about the axis of said cam shaft.

6. A plural-way valve pumping device according to claim 5 wherein said valve means comprises ball valves and the other plunger of each of said pairs of plungers includes an enlarged portion engaging said flexible diaphragm to guide said other plunger in its said valve passage and a smaller portion engaging the ball in said ball valves.

References Cited in the file of this patent

UNITED STATES PATENTS

| | | |
|---|---|---|
| 376,129 | Anderson | Jan. 10, 1888 |
| 1,740,602 | Keeler | Dec. 24, 1929 |
| 2,047,319 | Exley | July 14, 1936 |
| 2,075,600 | Baker | Mar. 30, 1937 |
| 2,120,412 | Kucki | June 14, 1938 |
| 2,263,470 | Perkins | Nov. 18, 1941 |
| 2,275,963 | Herman | Mar. 10, 1942 |
| 2,607,600 | Trautman | Aug. 19, 1952 |
| 2,613,864 | Carter | Oct. 14, 1952 |
| 2,795,359 | Lehman | June 11, 1957 |
| 2,881,958 | Sheen | Apr. 14, 1959 |